United States Patent
Moriyasu et al.

(10) Patent No.: US 9,617,426 B1
(45) Date of Patent: *Apr. 11, 2017

(54) ASPHALT MIXTURE, PROCESS FOR PRODUCTION OF SAME, AND PAVING METHOD USING SAME

(71) Applicant: MAEDA ROAD CONSTRUCTION CO., LTD, Tokyo (JP)

(72) Inventors: Hirochika Moriyasu, Tokyo (JP); Kentaro Koshi, Tokyo (JP); Hiroshi Taniguchi, Tokyo (JP); Keigo Hatakeyama, Tokyo (JP)

(73) Assignee: Maeda Road Construction Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,764

(22) Filed: Jun. 7, 2016

(30) Foreign Application Priority Data

Dec. 21, 2015 (JP) .................. 2015-248255

(51) Int. Cl.
C08L 95/00 (2006.01)
C08K 5/09 (2006.01)

(52) U.S. Cl.
CPC ............... *C08L 95/00* (2013.01); *C08K 5/09* (2013.01)

(58) Field of Classification Search
CPC ... C08L 95/00; C08L 2555/40; C09D 195/00; C08K 5/09; C08K 5/17; C08J 2395/00; C10C 3/00; E01C 7/18
See application file for complete search history.

(56) References Cited

U.S. PATENT DOCUMENTS

| | | | |
|---|---|---|---|
| 2003/0091389 A1* | 5/2003 | Zentner | E01C 11/005 404/17 |
| 2007/0128536 A1 | 6/2007 | Miyakawa | |
| 2012/0060722 A1* | 3/2012 | Montpeyroux | C04B 26/26 106/235 |

FOREIGN PATENT DOCUMENTS

| | | |
|---|---|---|
| JP | 11-012475 A | 1/1999 |
| JP | 2007-163753 A | 6/2007 |
| JP | 2010248472 A * | 11/2010 |
| JP | 5583978 B2 | 9/2014 |
| JP | 2015-143423 A | 8/2015 |
| JP | 2015-206245 | 11/2015 |
| WO | WO 2011/086722 A1 | 7/2011 |
| WO | WO 2015/107762 | 7/2015 |

OTHER PUBLICATIONS

JP 2010-248472 Translation.*
D. F. Zinkel, et al., Naval Stores, Production . Chemistry . Utilization, published Harima Chemicals Group, Inc., Jun. 1993, 6 pages.

* cited by examiner

*Primary Examiner* — Kaj K Olsen
*Assistant Examiner* — Alexandra M Moore
(74) *Attorney, Agent, or Firm* — Muncy, Geissler, Olds & Lowe, P.C.

(57) ABSTRACT

An asphalt mixture is provided which comprises an aggregate, an asphalt, a lubricative solidification material and an alkaline additive material that are mixed together. The lubricative solidification material contains a palmitic acid at a ratio of 1 to 15 wt %, a stearic acid at a ratio of 0.3 to 10 wt %, an oleic acid at a ratio of 39 to 59 wt %, a linoleic acid at a ratio of 20 to 48 wt %, and a linolenic acid at a ratio of 1 to 15 wt %.

8 Claims, 1 Drawing Sheet

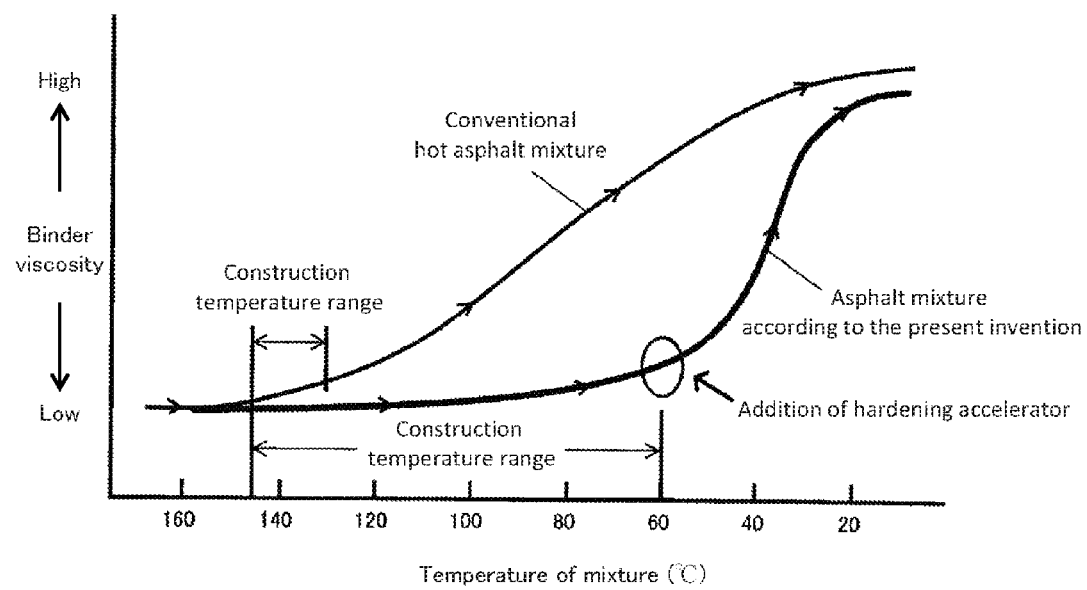

ASPHALT MIXTURE, PROCESS FOR PRODUCTION OF SAME, AND PAVING METHOD USING SAME

TECHNICAL FIELD

The present invention relates to an asphalt mixture to be used for road pavement and a process for production of the same, and also relates to a paving method using the same.

BACKGROUND ART

A hot asphalt mixture is usually used under an initial compacting temperature within a range of 110-140° C., such as provided by Pavement Construction Handbook ("Hosou Sekou Binran" in Japanese). However, even though the hot asphalt mixture can have a large strength immediately after being paved, the available period of time is until the temperature of the mixture decreases. Therefore, the application of the hot asphalt mixture may be difficult under various conditions, such as when a small amount of the mixture is divided to be used several times, when the mixture is transported for a long period of time, and when the constructed thickness is thin, such as in a thin layer overlay method, and the temperature significantly decreases immediately after the mixture is spread.

Accordingly, a hot asphalt mixture that uses a warm-mix technique and an ordinary temperature construction-type asphalt mixture are focused. The hot asphalt mixture that uses a warm-mix technique, i.e. a warm-mix asphalt mixture, is generally said to be able to extend the available temperature range of the hot asphalt mixture toward the lower limit side by about 30° C. The ordinary temperature construction-type asphalt mixture is an asphalt mixture that is said to allow the pavement construction under ordinary temperatures (100° C. or lower).

As an asphalt mixture that can be constructed under ordinary temperatures or under temperatures within a warm temperature region, for example, a so-called cutback asphalt mixture is proposed in which the viscosity of the asphalt mixture is forcibly reduced using a mineral oil or the like. In the cutback asphalt mixture, as disclosed in JP11-12475A, the asphalt is softened using a cutback material such as a mineral oil, and the strength of the asphalt mixture is developed as the cutback material is volatilized. However, according to the method in which, as described above, the asphalt is "cut back" using a mineral oil or the like thereby to forcibly reduce the viscosity at the time of pavement construction, there are drawbacks in that the mixture strength when the traffic of a road is opened, for example, may considerably deteriorate and the curing may require a long time.

An ordinary temperature construction-type asphalt mixture using an asphalt emulsion is also proposed, but the mixture has a relatively low strength even though the aggregate is not required to be heated and dried, and the applicable field may be limited because the decomposition rate of the asphalt emulsion may have to be taken into consideration. In addition, in the ordinary temperature asphalt mixture using an asphalt emulsion, the asphalt emulsion may possibly flow out if it rains before the emulsion is decomposed after the pavement construction.

In such a situation, JP Patent No. 5583978 discloses an ordinary temperature construction-type asphalt mixture that can be constructed under ordinary temperatures. This asphalt mixture uses a tall oil fatty acid as the cutback material (see, for example, "Naval Stores -Production- -Chemistry- -Utilization-" (published by Harima Chemicals Group, Inc., June 1993), line 10 of page 474 to line 9 of page 475). The tall oil fatty acid acts to reduce the viscosity of the asphalt mixture thereby to allow the pavement construction under ordinary temperatures. According to this technique of JP Patent No. 5583978, the tall oil fatty acid as the cutback material reacts with the cement after the pavement construction so as to act as a curing agent, which can thereby develop a sufficient strength.

On the other hand, also in an asphalt mixture that can be constructed under ordinary temperatures or under temperatures within a warm temperature region, the pavement body after the construction is required to have improved characteristics, such as further enhanced strength, durability, and flexibility. Therefore, an asphalt mixture is desired which can improve these characteristics and which can be constructed under ordinary temperatures or under temperatures within a warm temperature region.

SUMMARY OF THE INVENTION

Problem to be Solved by the Invention

The present invention has been proposed in view of the above, and an object of the present invention is to provide an asphalt mixture that can develop the strength within a relatively short time after the pavement construction and can give a pavement body having enhanced strength and durability and excellent in the flexibility.

Means for Solving the Problems

As a result of intensive studies to solve the above problems, the present inventors have found that, when producing an asphalt mixture, a lubricative solidification material that contains a linolenic acid at a ratio of 1 to 15 wt % and an alkaline additive material are added to and mixed with an aggregate and an asphalt to decrease the viscosity of the asphalt thereby to allow the pavement construction under temperatures within a low temperature region to ordinary temperatures and further to temperatures within a warm temperature region (e.g. −20° C. to 120° C., preferably −10° C. to 100° C.), while a hardening accelerator is fed to the mixture at the time of pavement construction so that the added lubricative solidification material and alkaline component undergo a saponification reaction or a neutralization reaction to increase the viscosity, and the asphalt mixture can thereby be provided which can develop a certain strength within a relatively short time. The present invention has thus been accomplished.

In particular, the present inventors have found that, by using a lubricative solidification material that contains a linolenic acid at a ratio of 1 to 15 wt %, the obtained pavement body can have enhanced strength and durability and can be excellent in the flexibility while allowing the pavement construction under ordinary temperatures or under temperatures within a warm temperature region. The present invention has thus been accomplished.

That is, according to an aspect of the present invention, there is provided an asphalt mixture comprising an aggregate, an asphalt, a lubricative solidification material and an alkaline additive material that are mixed together, wherein the lubricative solidification material contains a palmitic acid at a ratio of 1 to 15 wt %, a stearic acid at a ratio of 0.3 to wt %, an oleic acid at a ratio of 39 to 59 wt %, a linoleic acid at a ratio of 20 to 48 wt %, and a linolenic acid at a ratio of 1 to 15 wt %.

According to another aspect of the present invention, there is provided a paving method comprising: adding a hardening accelerator to the above asphalt mixture; and subjecting the lubricative solidification material and the alkaline additive material to a saponification reaction or a neutralization reaction thereby to enhance the strength.

According to a further aspect of the present invention, there is provided a process for production of the above asphalt mixture, the process comprising: a first step of mixing an aggregate heated to 100-170° C. and an asphalt heated to 130-170° C. using a mixing apparatus; a second step of adding and mixing the lubricative solidification material to a mixture obtained in the first step; and a third step of adding and mixing the alkaline additive material to a mixture obtained in the second step.

Effects of the Invention

According to the present invention, the lubricative solidification material having a low viscosity is added thereby to allow the pavement construction under temperatures within a low temperature region to ordinary temperatures and further to temperatures within a warm temperature region (e.g. −20° C. to 120° C., preferably −10° C. to 100° C.), while the hardening accelerator is fed at the time of pavement construction so that the alkaline additive material in the mixture is ionically decomposed thereby to undergo a saponification reaction or neutralization reaction with the lubricative solidification material, and a high strength can thus be developed at an early stage.

Moreover, according to the present invention, a lubricative solidification material that contains a linolenic acid at a ratio of 1 to 15 wt % is used, and therefore a pavement body can be obtained which has enhanced strength and durability and which is excellent in the flexibility while allowing the pavement construction under ordinary temperatures or under temperatures within a warm temperature region.

BRIEF DESCRIPTION OF THE DRAWINGS

The sole FIGURE is an explanatory diagram illustrating the concept of pavement construction temperature range for each of the asphalt mixture according to the present invention and a conventional asphalt mixture.

DESCRIPTION OF THE EMBODIMENTS

The asphalt mixture according to the present invention comprises an aggregate, an asphalt, a lubricative solidification material and an alkaline additive material that are mixed together, and is characterized in that the lubricative solidification material contains a linolenic acid at a ratio of 1 to 15 wt %. The asphalt mixture according to the present invention is designed such that a hardening accelerator is added to the mixture at the time of pavement construction so that the lubricative solidification material undergoes a saponification reaction or neutralization reaction with an alkaline component that is originated from the alkaline additive material, and the strength is thereby enhanced. In the present invention, water or the like may be used as the hardening accelerator.

The saponification reaction or neutralization reaction as used in the present invention may be a reaction to generate a fatty acid alkaline salt. Examples of the method for such a reaction include a saponification method in which an alkaline water is added to a fatty acid ester to generate a fatty acid alkaline salt (soap) and glycerin and a neutralization method in which a higher fatty acid is neutralized by an alkaline water.

In the saponification reaction, if the alkaline additive material is added in a solid form without any solvent such as water, the reaction does not start in general. On the other hand, the presence of a solvent such as water causes a reaction (saponification reaction or neutralization reaction) of "(fatty acid and resin acid in the lubricative solidification material)+(alkaline additive material)+(water)=(soap (solid))" to generate a soap thereby developing the strength.

The asphalt mixture according to the present invention is configured to contain an asphalt, an aggregate, a lubricative solidification material, and an alkaline additive material. The microstructure of the asphalt mixture is considered as follows. That is, a lubrication film configured of the lubricative solidification material having a low viscosity and the alkaline additive material appears to be present among aggregates formed thereon with asphalt coatings thereby to develop some lubrication effect. This allows the pavement body before the saponification reaction or neutralization reaction to remain in a low viscosity state. In other words, in the present invention, the lubricative solidification material acts, before the pavement construction, as a cutback material that reduces the viscosity of the asphalt mixture under temperatures within a low temperature region to ordinary temperatures and further to temperatures within a warm temperature region (e.g. −20° C. to 120° C., preferably −10° C. to 100° C.)

After such an asphalt mixture according to the present invention is used for pavement construction, the hardening accelerator (e.g. water) is sprayed thereon and compaction is performed using a roller. Otherwise, after compaction using a roller, the hardening accelerator (e.g. water) is sprayed. This allows the lubricative solidification material and alkaline additive material contained in the asphalt mixture to undergo a saponification reaction or a neutralization reaction which solidify the asphalt mixture under the presence of the hardening accelerator (e.g. water), and the strength can thus be enhanced. When performing pavement using the asphalt mixture according to the present invention, the method of compaction is not limited to a method using roller compaction and may appropriately be selected in accordance with the purpose of pavement. A method by beating may also be employed, for example, depending on the purpose of pavement.

The sole FIGURE is a conceptual diagram illustrating a relationship between the available temperature range (construction temperature range) and the binder viscosity for each of the asphalt mixture according to the present invention and a conventional hot asphalt mixture (a hot asphalt mixture that does not contain a lubricative solidification material and an alkaline additive material). The asphalt mixture according to the present invention has a wider available temperature range than that of the conventional hot asphalt mixture, and can be used for pavement construction even under temperatures within a range of −20° C. to 120° C. Moreover, when the hardening accelerator (e.g. water) is added to the asphalt mixture, the binder viscosity can be promptly enhanced to a certain degree comparable with that of the conventional hot asphalt mixture.

Each material that constitutes the asphalt mixture according to the present invention will then be described. The asphalt mixture according to the present invention is configured to contain an aggregate, an asphalt, a lubricative solidification material, and an alkaline additive material.

The aggregate is not particularly restricted. Examples of the aggregate to be appropriately used include those, such as crushed stone, sand and stone powder, which may be used for a typical asphalt for pavement. An aggregate of any granularity range, such as dense-grade and open-grade, may be used without restriction. As one example, an aggregate may be used of which the 2.36 mm sieve passing mass percentage is 15-800, which is a ratio of particles that pass through a sieve mesh with an aperture of 2.36 mm.

The asphalt is also not particularly restricted. Examples of the asphalt include straight asphalt and modified asphalt, which may be used without any restriction.

The aggregate and asphalt to be used in the present invention may contain a recycled aggregate as substitute for a regular aggregate.

The lubricative solidification material to be used in the present invention contains a linolenic acid at a ratio of 1 to 15 wt %. According to this feature of the present invention that the lubricative solidification material to be used contains a linolenic acid at a ratio of 1 to 15 wt %, the lubricative solidification material can act, before the pavement construction, as a cutback material that reduces the viscosity of the asphalt mixture under ordinary temperatures or under temperatures within a warm temperature region. This allows the pavement construction under ordinary temperatures or under temperatures within a warm temperature region, while the pavement body obtained by solidifying the asphalt mixture can have enhanced strength and durability and can be excellent in the flexibility. If the content of the linolenic acid is unduly small, the effect of enhancing the strength, durability and flexibility of the obtained pavement body will not be obtained. If the content of the linolenic acid is unduly large, the pavement construction under ordinary temperatures or under temperatures within a warm temperature region will be difficult. The content of the linolenic acid may preferably be 3 to 12 wt %, more preferably 4 to 10 wt %, further preferably 5 to 8 wt %, and furthermore preferably 5.5 to 7.5 wt %.

The lubricative solidification material to be used in the present invention may be sufficient if it contains a linolenic acid at a ratio of 1 to 15 wt %. However, in order to achieve a more significant effect of enhancing the strength, durability and flexibility of the obtained pavement body, the lubricative solidification material may contain a saturated fatty acid and an unsaturated fatty acid preferably at a ratio of 1:99 to 25:75, more preferably at a ratio of 2:98 to 20:80, and further preferably at a ratio of 3:97 to 18:82, as a weight ratio of "saturated fatty acid:unsaturated fatty acid."

In order to achieve a more significant effect of enhancing the strength, durability and flexibility of the obtained pavement body, the lubricative solidification material to be used in the present invention may preferably contain a palmitic acid, stearic acid, oleic acid, and linoleic acid in addition to the linolenic acid. These components may preferably be each contained at the content ratio as follows:

palmitic acid: preferably 1 to 15 wt %, more preferably 2 to 13 wt %, further preferably 3 to 12 wt %, and furthermore preferably 8 to 12 wt %;

stearic acid: preferably 0.3 to 10 wt %, more preferably 0.5 to 7 wt %, further preferably 0.8 to 6 wt %, and furthermore preferably 3 to 5.5 wt %;

oleic acid: preferably 20 to 59 wt %, more preferably 30 to 55 wt %, further preferably 39 to 48 wt %, and furthermore preferably 40 to 43 wt %;

linoleic acid: preferably 20 to 60 wt %, more preferably 30 to 48 wt %, further preferably 36 to 43 wt %, and furthermore preferably 36 to 39 wt %; and linolenic acid: 1 to 15 wt %, preferably 3 to 12 wt %, more preferably 4 to 10 wt %, further preferably 5 to 8 wt %, and furthermore preferably 5.5 to 7.5 wt %.

The lubricative solidification material to be used in the present invention may preferably contain a palmitoleic acid in addition to the palmitic acid, stearic acid, oleic acid, linoleic acid, and linolenic acid. The content of the palmitoleic acid may preferably be 0.3 to 2 wt %, more preferably 0.5 to 1.5 wt %, and further preferably 0.8 to 1.2 wt %.

In the present invention, the linoleic acid encompasses a conjugated linoleic acid that is an isomer in which double bonds are conjugated, and the linolenic acid encompasses an α-linolenic acid and a γ-linolenic acid.

The lubricative solidification material to be used in the present invention may contain other components in addition to the saturated fatty acid and unsaturated fatty acid. Examples of such other components include a resin acid. The resin acid may be a polycyclic diterpene that has a carboxyl group and of which the carbon number is 20. Specific examples of the polycyclic diterpene to be preferably used include a rosin that contains at least one type of abietic acid, dehydroabietic acid, neoabietic acid, pimaric acid, isopimaric acid, and palustric acid. The content ratio of the resin acid in the lubricative solidification material to be used in the present invention may preferably be 20 wt % or less, more preferably 10 wt % or less, and further preferably 5 wt % or less.

The content of the lubricative solidification material in the asphalt mixture of the present invention may preferably be 1 to 60 wt % in an embodiment and preferably 3 to 50 wt % in another embodiment to the total amount of 100 wt % of the asphalt and the lubricative solidification material. In an embodiment, in view of the use for the pavement construction under temperatures within a warm temperature region (e.g. 40° C. to 120° C.), it is more preferred that the content of the lubricative solidification material is 15 to 30 wt % to the total amount of 100 wt % of the asphalt and the lubricative solidification material. In an alternative embodiment, in view of the use for the pavement construction under temperatures within a low temperature region to ordinary temperatures (e.g. −20° C. to 40° C.), it is also more preferred that the content of the lubricative solidification material is 35 to 50 wt % to the total amount of 100 wt % of the asphalt and the lubricative solidification material. According to the feature that the content of the lubricative solidification material is within the above range, it is possible to appropriately enhance the strength, durability and flexibility of the obtained pavement body without deteriorating other characteristics. The additive amount of the lubricative solidification material can be determined to match the condition for pavement construction because the available temperature range is extended as the additive amount of the lubricative solidification material is increased.

The acid value of the lubricative solidification material to be used in the present invention is not particularly limited, but may preferably be 170 to 220 mgKOH/g, more preferably 180 to 210 mgKOH/g, and further preferably 190 to 205 mgKOH/g.

The iodine value of the lubricative solidification material to be used in the present invention may preferably be 95 to 160, more preferably 100 to 150, and further preferably 110 to 145.

The alkaline additive material is not particularly limited if it is a compound that becomes an alkaline component due to the action of the hardening accelerator (e.g. water). The alkaline additive material may preferably exhibit a low hydrogen-ion concentration (i.e. high pH) due to the action of the hardening accelerator in order to neutralize the fatty acid which includes linoleic acid. It is also possible to use typical ones, such as sodium hydroxide and potassium hydroxide, which may usually be used in soapmaking. From the environmental view point, however, an ordinary cement (ordinary Portland cement) may preferably be used which exhibits a low hydrogen-ion concentration due to the action of the hardening accelerator among cements that are used as typical civil engineering materials. Examples of the ordinary Portland cement to be used include those which contain, as main components, tricalcium silicate ($3CaO.SiO_2$), dicalcium silicate ($2CaO.SiO_2$), calcium aluminate ($3CaO.Al_2O_3$), calcium aluminoferrite ($4CaO.Al_2O_3.Fe_2O_3$), calcium sulfate ($CaSO_4.2H_2O$), and the like. Other than the above, an aqueous solution that contains metal ions such as sodium ions ($Na^+$), potassium ions ($K^+$), magnesium ions ($Mg^{2+}$) and calcium ions ($Ca^{2+}$), or a powder that contains a metal salt generating the above ions by adding water, or sodium hydrogen carbonate ($NaHCO_3$), potassium hydrogen carbonate ($KHCO_3$), or other appropriate substance, may be used as the alkaline additive material. The content ratio of the alkaline additive material in the asphalt mixture according to the present invention may preferably be within a range of 100:10 to 100:300 and more preferably within a range of 100:15 to 100:40 as a weight ratio of "lubricative solidification material:alkaline additive material."

Provided that the action and advantageous effects of the present invention are not impaired, other additives that are usually used in the field of asphalt pavement may be added to the asphalt mixture according to the present invention in addition to the above. Examples of such additives include, but are not particularly limited to, filler, plant fiber, pigment, and antifreezing agent.

First Embodiment

The asphalt mixture according to the present invention may be produced by the method as will be described below, for example, and the obtained mixture may be enclosed in a bag that comprises a moisture permeation preventing layer and a thermal fusion bonding layer, and can thereby be stored for a long time (e.g. 6 months).

A process for production of the asphalt mixture according to the present embodiment will hereinafter be described.

First, an aggregate is put into a mixing apparatus, and dry mixing for the aggregate is performed. The dry mixing may be performed under a condition in which the aggregate is heated to 100-170° C., preferably 100-140° C., and more preferably 110-130° C. The temperature and the amount of time for the dry mixing are not particularly limited, but the temperature for the dry mixing may ordinarily be 100-140° C. and preferably 110-130° C., while the amount of time for the dry mixing may ordinarily be about 1 second to 1 minute. In the present embodiment, the aggregate is used in the state of being heated to the above temperature thereby to allow the water amount contained in the aggregate to be controlled, so that the preservation stability of the obtained asphalt mixture can be improved.

Asphalt is then added to the mixing apparatus to be mixed with the aggregate. In the present embodiment, after being heated to 130-170° C. and preferably to 140-160° C., the asphalt is added to the mixing apparatus, and the mixing of the aggregate and asphalt is then conducted. The mixing temperature and mixing time during this operation are not particularly limited if a certain condition is obtained such that the asphalt layer is uniformly formed on the aggregate surface, but the mixing temperature may ordinarily be 100-140° C. and preferably 110-130° C., while the mixing time may ordinarily be about 1 second to 5 minutes.

Subsequently, a lubricative solidification material is added to the mixing apparatus to be mixed with the mixture obtained in the above manner. The lubricative solidification material may be used at ordinary temperatures, but may preferably be used after being heated to about 15-25° C., such as during the cold months. The mixing temperature and the mixing time during this operation are also not particularly limited, but the mixing temperature may ordinarily be 100-140° C. and preferably 110-130° C., while the mixing time may ordinarily be about 1 second to 5 minutes.

Thereafter, an alkaline additive material is added to the mixing apparatus to be mixed with the mixture obtained in the above manner. The mixing temperature and the mixing time during this operation are not particularly limited, but the mixing temperature may ordinarily be 100-140° C. and preferably 110-130° C., while the mixing time may ordinarily be about 1 second to 5 minutes.

In the present embodiment, the aggregate and the asphalt are mixed first, and the lubricative solidification material and the alkaline additive material are then added and mixed in this order thereby to allow the obtained asphalt mixture to have a configuration in which: some asphalt coating is formed on the surface of the aggregate; a layer comprising the lubricative solidification material is formed on the surface of the asphalt coating; and the alkaline additive material in a solid form covers the surface of the layer comprising the lubricative solidification material. This can enhance the reaction efficiency between the alkaline additive material and the hardening accelerator, and even if a relatively small amount of the alkaline additive material is added, the strength improvement effect can sufficiently be developed when the hardening accelerator is added. In addition, the alkaline additive material may be added with a relatively small amount thereby to allow the obtained asphalt mixture to have excellent preservation stability.

The mixture obtained in the above manner is then taken out from the mixing apparatus in a state of being maintained at a temperature of 100-130° C., and the asphalt mixture according to the present embodiment can thus be produced.

In the present embodiment, a bag that comprises a moisture permeation preventing layer and a thermal fusion bonding layer is filled with the asphalt mixture obtained in such a manner, and the thermal fusion bonding layer is then heated and pressed using a heat sealer or the like so that the thermal fusion bonding layer is thermally fused and bonded, whereby the asphalt mixture is enclosed in the bag. According to the present embodiment, the bag having a moisture permeation preventing layer is used as a bag for enclosing the asphalt mixture thereby to reduce the water amount getting through into the bag (e.g. to reduce the water amount getting through into the bag to about 0.1-1% or less), so that the asphalt mixture has excellent preservation stability. Moreover, the asphalt mixture is enclosed in the bag that comprises a moisture permeation preventing layer and a thermal fusion bonding layer in such a manner, thereby to prevent the alkaline additive material contained in the asphalt mixture from being deactivated due to the reaction with water, and the compounding amount of the alkaline additive material can thus be relatively small. More specifically, the compounding amount of the alkaline additive material may preferably be within a range of 100:15 to 100:40 as a weight ratio of "lubricative solidification material:alkaline additive material."

In the bag that comprises a moisture permeation preventing layer and a thermal fusion bonding layer to be used in the present embodiment, examples of a material that constitutes the moisture permeation preventing layer include nylon and ethylene-vinylalcohol copolymer. Examples of a material that constitutes the thermal fusion bonding layer include polyolefin. In the present embodiment, the bag that comprises a moisture permeation preventing layer and a thermal fusion bonding layer may preferably be a bag that has a three-layer structure of thermal fusion bonding layer/moisture permeation preventing layer/thermal fusion bonding layer, and may particularly preferably be a bag that has a three-layer structure of polyolefin layer/nylon layer/polyolefin layer. A base material that constitutes the bag comprising a moisture permeation preventing layer and a thermal fusion bonding layer to be used in the present embodiment (portion other than the moisture permeation preventing layer and the thermal fusion bonding layer) is not particularly limited, and examples thereof include paper and aluminum foil.

The asphalt mixture obtained in such a manner may be put out from the bag comprising a moisture permeation preventing layer and a thermal fusion bonding layer and used for pavement construction, for example, and then added thereto with the hardening accelerator (e.g. water) and compacted (or otherwise compacted and then added thereto with the hardening accelerator), and the lubricative solidification material and alkaline additive material that are contained in the asphalt mixture can thus be subjected to a saponification reaction or a neutralization reaction and solidified due to the hardening accelerator thereby to develop the strength. In particular, the asphalt mixture according to the present embodiment has an enhanced initial strength compared with that of a conventional ordinary temperature mixture packed in a bag, and the strength is developed at an early stage.

Second Embodiment

In an alternative embodiment of the present invention, the mixture to be obtained in the above process may be configured such that the alkaline additive material is added thereto, in addition to the hardening accelerator (e.g. water), when the lubricative solidification material and the alkaline component are subjected to a saponification reaction or a neutralization reaction.

In this case, the above-described alkaline additive material may be used as the alkaline additive material to be added with the hardening accelerator, for example, but it is particularly preferred to use potassium pyrophosphate.

According to the present embodiment, by employing a configuration in which the alkaline additive material is added in addition to the hardening accelerator when the lubricative solidification material and the alkaline component are subjected to a saponification reaction or a neutralization reaction, the ratio of the alkaline additive material to be contained in the asphalt mixture can be suppressed to a low value thereby to enhance the preservation stability of the asphalt mixture. For example, in this case, the ratio of the alkaline additive material in the asphalt mixture may preferably be within a range of 100:1 to 100:10 as a weight ratio of "lubricative solidification material:alkaline additive material". Otherwise, in this case, the alkaline additive material may not be added at all. Further, in this case, if the ratio of the alkaline additive material in the asphalt mixture is suppressed to a low value, then it is possible even to use a bag that does not have any moisture permeation preventing layer or a bag that has less sealing property as the bag for enclosing the asphalt mixture. In addition, the asphalt mixture according to the present embodiment has an enhanced initial strength compared with that of a conventional ordinary temperature mixture packed in a bag, and the strength is developed at an early stage.

EXAMPLES

The present invention will hereinafter be described with reference to more detailed examples, but the present invention is not limited to these examples.

Examples 1 to 6

Each asphalt mixture was obtained by compounding an aggregate, a straight asphalt, a lubricative solidification material (trade name "PM200" available from MIYOSHI OIL & FAT CO., LTD.), and an ordinary Portland cement into a twin-shaft pug mill-type mixer (1 batch: 30 to 60 kg) in this order and mixing them. During this operation, the heating temperature for the aggregate was 110-130° C., the heating temperature for the asphalt was 150-165° C., and other members were at ordinary temperatures. The lubricative solidification material (trade name "PM200" available from MIYOSHI OIL & FAT CO., LTD.) used in Examples 1 to 6 has properties as below:

component ratio: 11 wt % of palmitic acid, 4 wt % of stearic acid, 1 wt % of palmitoleic acid, 41 wt % of oleic acid, 37 wt % of linoleic acid, and 6 wt % of linolenic acid;

acid value: 195 to 203; and iodine value: 112 to 122.

In each of Examples 1 to 6, two types of asphalt mixtures were prepared to have a compounding amount of the lubricative solidification material to the total of 100 wt % of the straight asphalt and the lubricative solidification material as follows:

compounding amount of the lubricative solidification material: 5 wt % (Example 1);

compounding amount of the lubricative solidification material: 10 wt % (Example 2);

compounding amount of the lubricative solidification material: 15 wt % (Example 3);

compounding amount of the lubricative solidification material: 20 wt % (Example 4);

compounding amount of the lubricative solidification material: 25 wt % (Example 5); and compounding amount of the lubricative solidification material: 30 wt % (Example 6).

Specifically, two types of mixtures of "ordinary compounding" and "pervious compounding" were obtained (here and hereinafter in Example 7 and Comparative Examples 1 to 7). In the "ordinary compounding," an aggregate having the combined gradation as listed in Table 1 was used as the aggregate, and the compounding amounts of the aggregate, straight asphalt, lubricative solidification material and ordinary Portland cement were those as listed in Table 2. In the "pervious compounding," an aggregate having the combined gradation as listed in Table 3 was used as the aggregate, and the compounding amounts of the aggregate, straight asphalt, lubricative solidification material and ordinary Portland cement were those as listed in Table 4.

TABLE 1

| Aggregate for "ordinary compounding" | | |
|---|---|---|
| Passing mass percentage (%) | 19.0 mm | 100.0 |
| | 13.2 mm | 97.0 |
| | 4.75 mm | 62.8 |
| | 2.36 mm | 42.8 |
| | 600 μm | 25.2 |
| | 300 μm | 16.2 |
| | 150 μm | 9.4 |
| | 75 μm | 6.3 |

TABLE 2

Composition for "ordinary compounding"

|  | Example 1 | Example 2 | Example 3 | Example 4 | Example 5 | Example 6 |
|---|---|---|---|---|---|---|
| Compounding amount of lubricative solidification material (wt % to total 100 wt % of straight asphalt and lubricative solidification material) | 5 | 10 | 15 | 20 | 25 | 30 |
| Aggregate (parts by weight) | 100.0 | 100.0 | 100.0 | 100.0 | 100.0 | 100.0 |
| Straight asphalt (parts by weight) | 5.55 | 5.28 | 5.01 | 4.74 | 4.46 | 4.18 |
| Lubricative solidification material (parts by weight) | 0.29 | 0.59 | 0.88 | 1.18 | 1.49 | 1.79 |
| Ordinary Portland cement (parts by weight) | 0.44 | 0.88 | 1.33 | 1.78 | 2.23 | 2.69 |

TABLE 3

Aggregate for "pervious compounding"

| Passing mass percentage (%) | 19.0 mm | 100.0 |
|---|---|---|
|  | 13.2 mm | 97.9 |
|  | 4.75 mm | 30.1 |
|  | 2.36 mm | 18.0 |
|  | 600 μm | 10.5 |
|  | 300 μm | 7.6 |
|  | 150 μm | 6.2 |
|  | 75 μm | 4.2 |

TABLE 4

Composition for "pervious compounding"

|  | Example 1 | Example 2 | Example 3 | Example 4 | Example 5 | Example 6 |
|---|---|---|---|---|---|---|
| Compounding amount of lubricative solidification material (wt % to total 100 wt % of straight asphalt and lubricative solidification material) | 5 | 10 | 15 | 20 | 25 | 30 |
| Aggregate (parts by weight) | 100.0 | 100.0 | 100.0 | 100.0 | 100.0 | 100.0 |
| Straight asphalt (parts by weight) | 4.34 | 4.13 | 3.92 | 3.70 | 3.49 | 3.27 |
| Lubricative solidification material (parts by weight) | 0.23 | 0.46 | 0.69 | 0.93 | 1.16 | 1.40 |
| Ordinary Portland cement (parts by weight) | 0.34 | 0.69 | 1.04 | 1.39 | 1.74 | 2.10 |

Example 7

An asphalt mixture was obtained in the same manner as in Example 4 except that a lubricative solidification material (trade name "PM400" available from MIYOSHI OIL & FAT CO., LTD.) was used as substitute for the lubricative solidification material (trade name "PM200" available from MIYOSHI OIL & FAT CO., LTD). In Example 7, therefore, the compounding amount of the lubricative solidification material was 20 wt % to the total of 100 wt % of the straight asphalt and the lubricative solidification material.

The lubricative solidification material (trade name "PM400" available from MIYOSHI OIL & FAT CO., LTD.) used in Example 7 has properties as below:
component ratio: 4 wt % of palmitic acid, 1 wt % of stearic acid, 46 wt % of oleic acid, 42 wt % of linoleic acid, and 7 wt % of linolenic acid;
acid value: 193 to 203; and
iodine value: 120 to 140.

Comparative Examples 1 to 6

An asphalt mixture according to each of Comparative Examples 1 to 6 was obtained with the same compounding ratio as in each of Examples 1 to 6 except that a lubricative solidification material (tall oil fatty acid, trade name "HARTALL FA-1" available from Harima Chemicals Group, Inc.) was used as substitute for the lubricative solidification material (trade name "PM200" available from MIYOSHI OIL & FAT CO., LTD). The tall oil fatty acid (trade name "HARTALL FA-1" available from Harima Chemicals Group, Inc.) used in Comparative Examples 1 to 6 has properties as below:
"fatty acid:resin acid"=98.5:1.5 (weight ratio);
unsaponifiable matter content: 2.0 wt %;
component ratio of fatty acid: 1-3 wt % of palmitic acid, 1-3 wt % of stearic acid, 40-50 wt % of oleic acid, and 35-45 wt % of linoleic acid;
type of resin acid: rosin; and
acid value: 194 mgKOH/g.

In each of Comparative Examples 1 to 6, the compounding amount of the lubricative solidification material to the total of 100 wt % of the straight asphalt and the lubricative solidification material was as follows:
compounding amount of the lubricative solidification material: 5 wt % (Comparative Example 1);
compounding amount of the lubricative solidification material: 10 wt % (Comparative Example 2);
compounding amount of the lubricative solidification material: 15 wt % (Comparative Example 3);
compounding amount of the lubricative solidification material: 20 wt % (Comparative Example 4);
compounding amount of the lubricative solidification material: 25 wt % (Comparative Example 5); and
compounding amount of the lubricative solidification material: 30 wt % (Comparative Example 6).

Comparative Example 7

An asphalt mixture was obtained in the same manner as in Example 1 except that the lubricative solidification material (trade name "PM200" available from MIYOSHI OIL & FAT CO., LTD.) and ordinary Portland cement were not compounded. In Comparative Example 7, the "ordinary compounding" involved 100 parts by weight of aggregate and 5.82 parts by weight of straight asphalt, and the "pervious compounding" involved 100 parts by weight of aggregate and 4.55 parts by weight of straight asphalt.

Evaluation of Asphalt Mixtures of Examples 1 to 7 and Comparative Examples 1 to 7

The asphalt mixtures of Examples 1 to 7 and Comparative Examples 1 to 7 obtained in the above manner were each put into a mold (formwork) heated to the compaction temperature and water was then added to perform compaction (50 times for each of both surfaces). After being cured for 7 days under the condition of a temperature of 20° C. and a humidity of 60%, test pieces were obtained. Two types of test pieces were obtained, one type using the "ordinary compounding," the other using the "pervious compounding." The test pieces thus obtained were used to perform the following wheel tracking test, twisting test, and bending test.

(Wheel Tracking Test)

For the test pieces using the "ordinary compounding," the wheel tracking test was performed at a testing temperature of 60° C. in accordance with "3-7-1" and "3-7-3" of the "Pavement Testing Method Handbook" ("Hosou Shikenhou Binran" in Japanese) (published by Japan Road Association, November 1988) to obtain dynamic stability (times/mm). As the value of dynamic stability (times/mm) increases, the strength also increases to mitigate the occurrence of rutting, which may be preferred. Results are listed in Table 5. In Table 5, the results of each of the examples and comparative examples are listed in association with the type of the compounded lubricative solidification material and the compounding amount of the lubricative solidification material (here and hereinafter in Tables 6 and 7).

TABLE 5

| | | Compounding amount of lubricative solidification material (wt % to total 100 wt % of straight asphalt and lubricative solidification material) | | | | | | |
|---|---|---|---|---|---|---|---|---|
| | | 0 | 5 | 10 | 15 | 20 | 25 | 30 |
| Dynamic stability (times/mm) | PM200 (6 wt % of linolenic acid) (Examples 1 to 6) | — | 760 | 1,200 | 3,000 | 4,500 | 7,000 | 10,500 |
| | PM400 (7 wt % of linolenic acid) (Example 7) | — | — | — | — | 5,000 | — | — |
| | Tall oil fatty acid (without linolenic acid) (Comparative Examples 1 to 7) | 500 | 600 | 880 | 1,400 | 1,900 | 4,000 | 7,000 |

(Twisting Test)

For the test pieces using the "pervious compounding," the twisting test was performed at a testing temperature of 50° C. for 2 hours of the testing time in accordance with the "Measuring Method using a Twisted Aggregate Scattering Tester for Obtaining a Twisted Aggregate Scattering Value, Supplementary Volume of Pavement Performance Evaluation Method" to obtain an aggregate scattering ratio (%) of the aggregate from the test pieces. When a test piece disintegrated before the testing time of 2 hours passed, the disintegration time was obtained. In the twisting test, as the aggregate scattering ratio decreases, or the time before the test piece disintegrates increases, the durability to torque becomes high, which may be preferred. Results are listed in Table 6.

TABLE 6

| | | Compounding amount of lubricative solidification material (wt % to total 100 wt % of straight asphalt and lubricative solidification material) | | | | | | |
|---|---|---|---|---|---|---|---|---|
| | | 0 | 5 | 10 | 15 | 20 | 25 | 30 |
| Aggregate scattering ratio (%) | PM200 (6 wt % of linolenic acid) (Examples 1 to 6) | — | Disintegration after 40 min. | Disinteration after 60 min. | 21.8 | 5.3 | 3.0 | 0.9 |
| | PM400 (7 wt % of linolenic acid) (Example 7) | — | — | — | — | 4.8 | — | — |

TABLE 6-continued

| | Compounding amount of lubricative solidification material (wt % to total 100 wt % of straight asphalt and lubricative solidification material) | | | | | | |
|---|---|---|---|---|---|---|---|
| | 0 | 5 | 10 | 15 | 20 | 25 | 30 |
| Tall oil fatty acid (without linolenic acid) (Comparative Examples 1 to 7) | Disintegration after 25 min. | Disintegration after 30 min, | Disintegration after 40 min. | Disintegration after 100 min. | 10.8 | 6.4 | 2.8 |

(Bending Test)

For the test pieces using the "ordinary compounding," the bending test was performed at a testing temperature of −10° C. in accordance with the "Pavement Investigation/Testing Method Handbook B005" ("Hosou Chosa/Shikenhou Binran" in Japanese) to obtain breaking strain ($\times 10^{-3}$ mm/mm). In the bending test, as the breaking strain increases, the flexibility becomes excellent to mitigate the occurrence of cracks, which may be preferred. Results are listed in Table 7.

TABLE 7

| | | Compounding amount of lubricative solidification material (wt % to total 100 wt % of straight asphalt and lubricative solidification material) | | | | | | |
|---|---|---|---|---|---|---|---|---|
| | | 0 | 5 | 10 | 15 | 20 | 25 | 30 |
| Breaking strain ($\times 10^{-3}$ mm/mm) | PM200 (6 wt % of linolenic acid) (Examples 1 to 6) | — | 2.5 | 2.8 | 3.2 | 3.7 | 3.9 | 4.1 |
| | PM400 (7 wt % of linolenic acid) (Example 7) | — | — | — | — | 4.0 | — | — |
| | Tall oil fatty acid (without linolenic acid) (Comparative Examples 1 to 7) | 2.3 | 2.2 | 2.3 | 2.4 | 2.3 | 2.3 | 2.4 |

Evaluation of Examples 1 to 7 and Comparative Examples 1 to 7

As found from Tables 5 to 7, it can be confirmed that, when the lubricative solidification materials ("PM200" and "PM400") containing linolenic acid at a ratio of 1 to 15 wt % are used, the test pieces excellent in the dynamic stability (wheel tracking test), durability to torque (twisting test), and breaking strain (bending test) are obtained, and the effect of improving the strength, durability and flexibility is high, compared with when using the same additive amount of the lubricative solidification materials (tall oil fatty acid) which do not contain linolenic acid.

Regarding "PM400", only a test result in which the compounding amount of the lubricative solidification material is 20 wt % was shown, however, results when changing the compounding amount showed a same tendency as the results when "PM200" was used.

Example 8

An asphalt mixture was obtained in the same manner as in Example 1 except that the compounding amount of the lubricative solidification material (trade name "PM200" available from MIYOSHI OIL & FAT CO., LTD.) was 45 wt % to the total of 100 wt % of the straight asphalt and the lubricative solidification material. In Example 8, 100 parts by weight of aggregate having the combined gradation as listed in Table 1, 3.22 parts by weight of straight asphalt, 2.64 parts by weight of lubricative solidification material, and 0.66 parts by weight of ordinary Portland cement were used. In Example 8, only the "ordinary compounding" was prepared, and the "pervious compounding" was not prepared (here and hereinafter in Example 9 and Comparative Example 8).

Example 9

An asphalt mixture was obtained in the same manner as in Example 8 except that a lubricative solidification material (trade name "PM400" available from MIYOSHI OIL & FAT CO., LTD.) was used as substitute for the lubricative solidification material (trade name "PM200" available from MIYOSHI OIL & FAT CO., LTD).

Comparative Example 8

An asphalt mixture was obtained in the same manner as in Example 8 except that a lubricative solidification material (tall oil fatty acid, trade name "HARTALL FA-1" available from Harima Chemicals Group, Inc.) was used as substitute for the lubricative solidification material (trade name "PM200" available from MIYOSHI OIL & FAT CO., LTD).

Evaluation of Asphalt Mixtures of Examples 8 and 9 and Comparative Example 8

The asphalt mixtures of Examples 8 and 9 and Comparative Example 8 obtained in the above manner were each put into a mold (formwork) heated to the compaction temperature and water was then added to perform compaction (50 times for each of both surfaces). After being cured, test pieces were obtained. The test pieces included Test Pieces A obtained after curing for 1 hour under the condition of a temperature of 20° C. and a humidity of 60% and Test Pieces B obtained after curing for 7 days under the condition of a temperature of 20° C. and a humidity of 60%. The test pieces thus obtained were used to perform the following measurement of Marshal stability.

(Marshall Stability)

Measurement of Marshall stability was conducted using the obtained Test Pieces A and B. The measurement of Marshall stability was performed at 20° C. for Test Pieces A (curing time: 1 hour) and performed at 60° C. for Test Pieces B (curing time: 7 days). Results are listed in Table 8. As the value of Marshall stability (kN) increases, it can be determined that a stable and high-strength test piece is obtained at an earlier stage, which may be preferred.

TABLE 8

|  | Marshall stability (kN) | |
| --- | --- | --- |
|  | Curing for 1 hour (Testing temperature 20° C.) | Curing for 7 days (Testing temperature 60° C.) |
| PM200 (6 wt % of linolenic acid) (Example 8) | 5.6 | 12.8 |
| PM400 (7 wt % of linolenic acid) (Example 9) | 5.7 | 14.1 |
| Tall oil fatty acid (without linolenic acid) (Comparative Example 8) | 5.3 | 11.4 |

Evaluation of Examples 8 and 9 and Comparative Example 8

As found from Table 8, it can be confirmed that, when the lubricative solidification materials ("PM200" and "PM400") containing linolenic acid at a ratio of 1 to 15 wt % are used, the value of Marshall stability is high and the strength can be developed at an earlier stage compared with when using the same additive amount of the lubricative solidification material (tall oil fatty acid) which does not contain linolenic acid.

The invention claimed is:

1. An asphalt mixture comprising an aggregate, an asphalt, a lubricative solidification material and an alkaline additive material that are mixed together,
    wherein the lubricative solidification material contains a palmitic acid at a ratio of from 1 to 15 wt %, a stearic acid at a ratio of from 0.3 to 10 wt %, an oleic acid at a ratio of from 39 to 59 wt %, a linoleic acid at a ratio of from 20 to 48 wt %, and a linolenic acid at a ratio of from 5.5 to 15 wt %.

2. The asphalt mixture according to claim 1, wherein the lubricative solidification material contains a saturated fatty acid and an unsaturated fatty acid, and a weight ratio of the saturated fatty acid and the unsaturated fatty acid is from 1:99 to 25:75 as a weight ratio of "saturated fatty acid: unsaturated fatty acid.".

3. The asphalt mixture according to claim 1, wherein a content of the lubricative solidification material is from 1 to 60 wt % with respect to a total amount of 100 wt % of the asphalt and the lubricative solidification material.

4. The asphalt mixture according to claim 1, wherein a ratio of the lubricative solidification material and the alkaline additive material is within a range of from 100:10 to 100:300 as a weight ratio of "lubricative solidification material:alkaline additive material.".

5. A paving method comprising: adding a hardening accelerator to the asphalt mixture according to claim 1; and subjecting the lubricative solidification material and the alkaline additive material to saponification reaction or neutralization reaction thereby to enhance the strength.

6. A paving method comprising: adding an additional alkaline additive material and a hardening accelerator to the asphalt mixture according to claim 1; and subjecting the lubricative solidification material to saponification reaction or neutralization reaction with the additional alkaline additive material and the alkaline additive material which is included the asphalt mixture thereby to enhance the strength.

7. A process for production of the asphalt mixture according to claim 1, the process comprising:
    a first step that mixes an aggregate heated to 100-170° C. and an asphalt heated to 130-170° C. using a mixing apparatus;
    a second step that adds and mixes the lubricative solidification material to a mixture obtained in the first step; and
    a third step that adds and mixes the alkaline additive material to a mixture obtained in the second step.

8. The process for production of an asphalt mixture according to claim 7, further comprising:
    a fourth step that fills a bag comprising a moisture permeation preventing layer and a thermal fusion bonding layer with a mixture obtained in the third step and then thermally fuses and bonds the thermal fusion bonding layer thereby to enclose the mixture in the bag.

* * * * *